(12) United States Patent
Reel et al.

(10) Patent No.: US 8,182,042 B2
(45) Date of Patent: May 22, 2012

(54) ADJUSTABLE VEHICLE HEAD RESTRAINT ASSEMBLY

(75) Inventors: Travis M. Reel, Ridgeway, OH (US); Terrie Ellison, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 122 days.

(21) Appl. No.: 12/699,642

(22) Filed: Feb. 3, 2010

(65) Prior Publication Data

US 2011/0187172 A1 Aug. 4, 2011

(51) Int. Cl.
*A47C 7/36* (2006.01)
(52) U.S. Cl. ........................................ 297/391
(58) Field of Classification Search .................. 297/391, 297/407, 406, 409
See application file for complete search history.

(56) References Cited

U.S. PATENT DOCUMENTS

| | | | |
|---|---|---|---|
| 638,534 A | 12/1899 | Welch | |
| 1,746,091 A | 2/1930 | Skidmore | |
| 4,191,422 A | 3/1980 | Inasawa et al. | |
| 4,856,848 A | 8/1989 | O'Sullivan et al. | |
| 5,080,436 A * | 1/1992 | Meiller | 297/391 |
| 5,669,666 A | 9/1997 | Lee | |
| 6,983,995 B1 | 1/2006 | Veine et al. | |
| 2008/0296953 A1 * | 12/2008 | Veine et al. | 297/407 |
| 2009/0058162 A1 | 3/2009 | Boes et al. | |

* cited by examiner

*Primary Examiner* — Milton Nelson, Jr.
(74) *Attorney, Agent, or Firm* — Rankin Hill & Clark LLP

(57) ABSTRACT

A vehicle head restraint assembly includes a support frame, a stay, and a rack and pinion assembly. The support frame supports a head restraint cushion. The stay connects with a vehicle seat back. The rack and pinion assembly connects with the support frame and the stay. The rack and pinion assembly is configured to allow for selective movement of the support frame with respect to the stay along a translational axis. The rack and pinion assembly includes a pinion, a rack, and a locking cage. The pinion includes a plurality of pinion teeth. The rack includes a plurality of rack teeth. The rack teeth engage the pinion teeth when the support frame moves in the translational axis with respect to the stay. The locking cage selectively engages the rack and is spaced from the rack teeth. The locking cage includes locking cage teeth.

21 Claims, 7 Drawing Sheets

ADJUSTABLE VEHICLE HEAD RESTRAINT ASSEMBLY

BACKGROUND

This disclosure is related to a vehicle seat, and more particularly to an adjustable head restraint for a vehicle seat. Vehicle head restraints extend above a seat back of a vehicle seat. Known head restraints are typically adjustable in a vertical direction. Some known head restraints are also adjustable in a longitudinal direction, i.e. in the direction of travel for the vehicle.

Some known vehicle head restraints that are longitudinally adjustable include a rack and pinion arrangement. One such longitudinally adjustable head restraint includes a pinion that is rotated by an operator turning a knob. Such an arrangement includes a complicated locking mechanism to preclude movement of the pinion with respect to the rack. Other head restraints that are vertically adjustable also are known to employ a rack and pinion assembly; however, these known head restraints also include a complicated or cumbersome locking mechanism.

SUMMARY

A vehicle head restraint assembly that can be adjustable in a longitudinal direction includes a support frame, a stay, and a rack and pinion assembly. The support frame can support a head restraint cushion. The stay is configured to connect with an associated vehicle seat back. The rack and pinion assembly connects with the support frame and the stay. The rack and pinion assembly can be configured to allow for selective movement of the support frame with respect to the stay along a translational axis. The rack and pinion assembly includes a pinion, a rack, and a locking cage. The pinion includes a plurality of pinion teeth. The rack includes a plurality of rack teeth. The rack teeth engage the pinion teeth when the support frame moves in the translational axis with respect to the stay. The locking cage selectively engages the rack and is spaced from the rack teeth. The locking cage includes locking cage teeth. When the locking cage is engaged with the rack, the locking cage teeth engage the pinion teeth to inhibit movement of the support frame with respect to the stay.

Another example of a vehicle head restraint assembly includes a stay, a support frame, a rack, a pinion, and a load bearing support. The stay is configured to connect with an associated vehicle seat back. The support frame supports a head restraint cushion. The support frame connects with the stay in a manner that allows the support frame to selectively move with respect to the stay. The rack connects with the support frame and the stay. The pinion connects with the stay and engages the rack. The load bearing support connects with the stay and the rack. The load bearing support contacts the rack offset from a rotational axis of the pinion.

Another example of a vehicle head restraint assembly includes a stay, a pinion, a rack, a support frame, and moveable locking cage. The pinion connects adjacent one end of the stay. The rack engages the pinion. The support frame is fixed to the rack for movement therewith. The moveable locking cage is moveable between a first operating position and a second operating position. When in the first operating position, the support frame is precluded from moving with respect to the frame. When in the second operating position, the support frame is moveable with respect to the frame.

DETAILED DESCRIPTION

Figure 1:
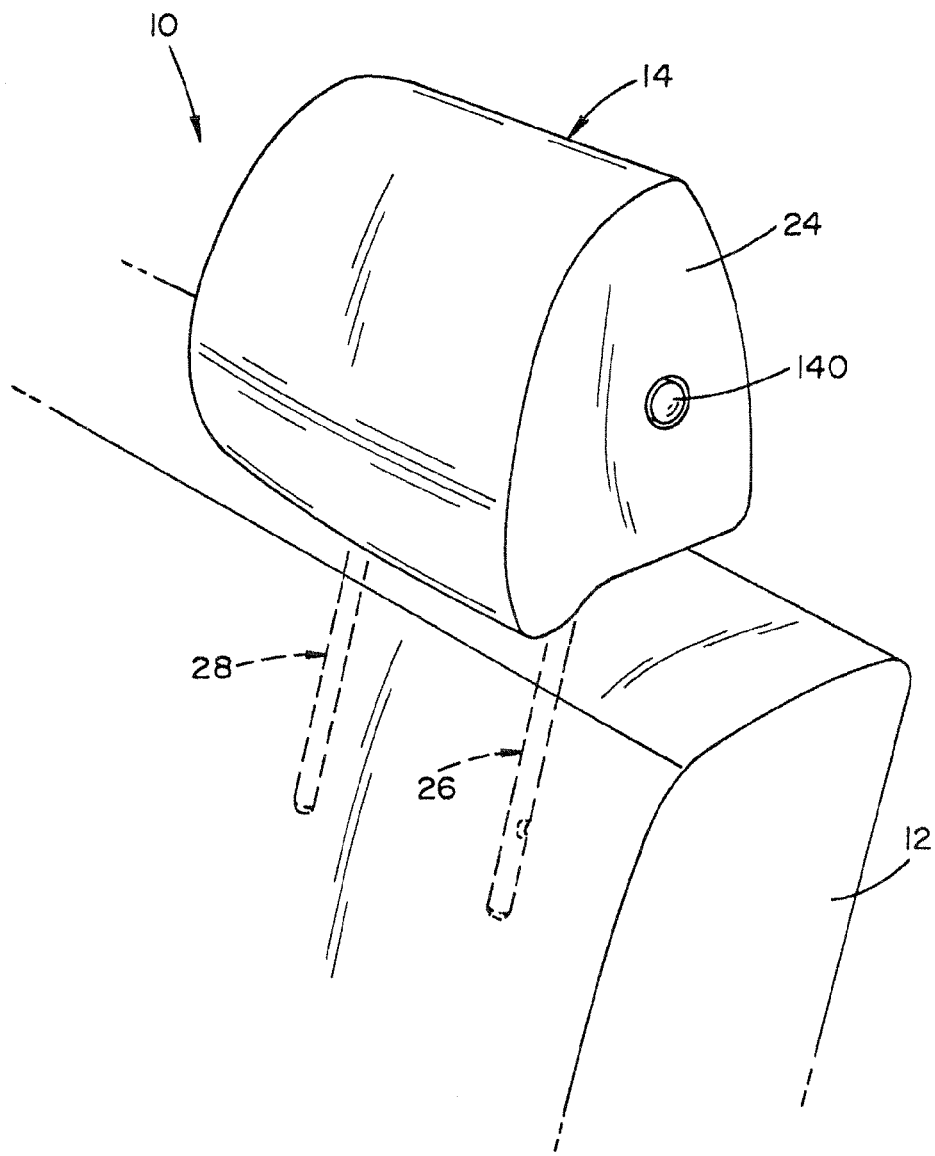
FIG. 1 is a perspective view of an upper portion of a vehicle seat including a head restraint and a vehicle seat back.
Figure 2C:
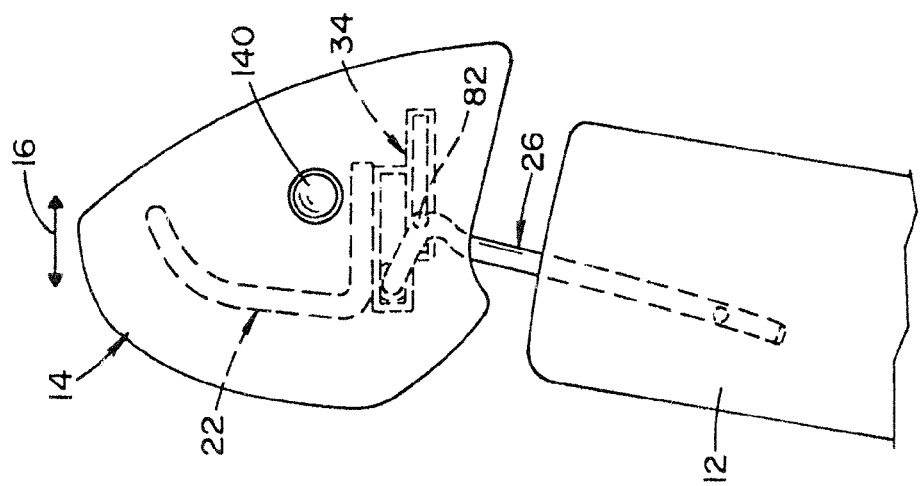
FIGS. 2A-2C are side elevation views of the portion of the vehicle seat shown in FIG. 1 depicting different positions of the head restraint with respect to the seat back.
Figure 2B:
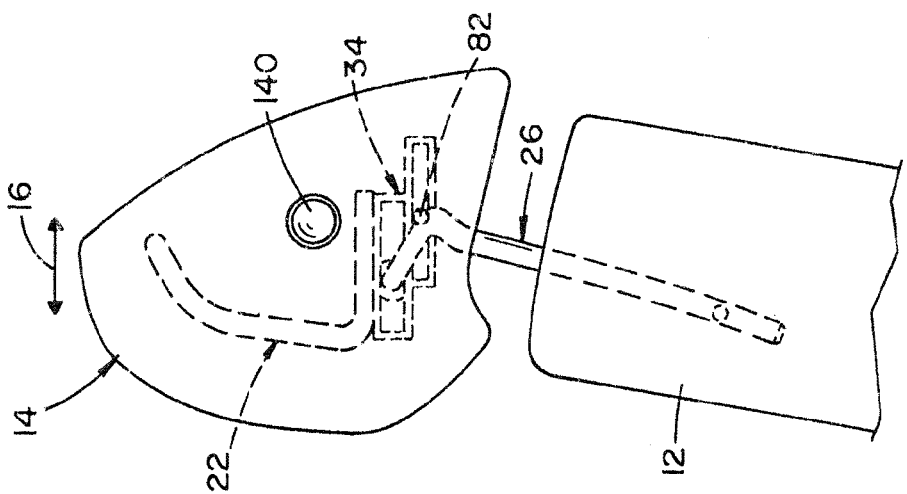
Figure 2A:
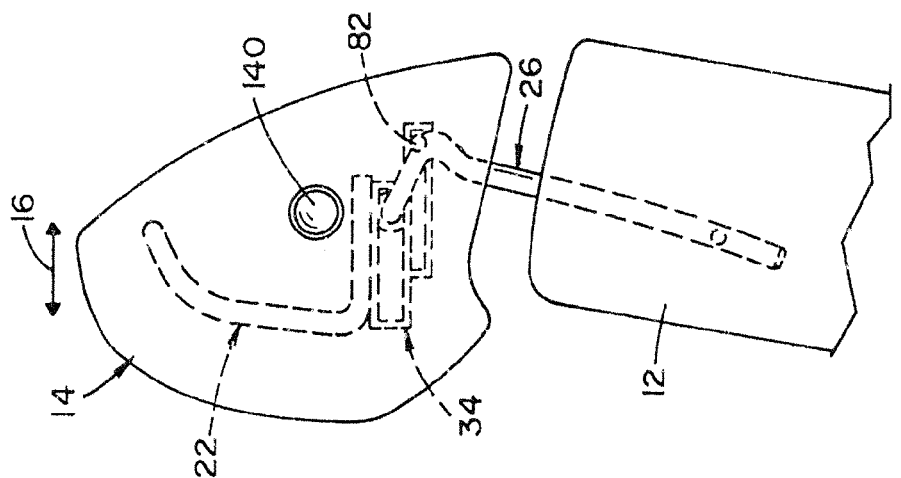

With reference to FIG. 1, a vehicle seat 10 includes a seat back 12 and a head restraint 14 connected with the seat back. With reference to FIGS. 2A-2C, the head restraint 14 is moveable with respect to the seat back 12 in a translational axis 16, which can be generally parallel with a direction of travel for the vehicle (not shown) in which the vehicle seat 10 is located. FIG. 2A depicts the head restraint 14 in a forward most position. FIG. 2B depicts the head restraint 14 in an intermediate position. FIG. 2C depicts the head restraint in a rearmost position.

Figure 3:
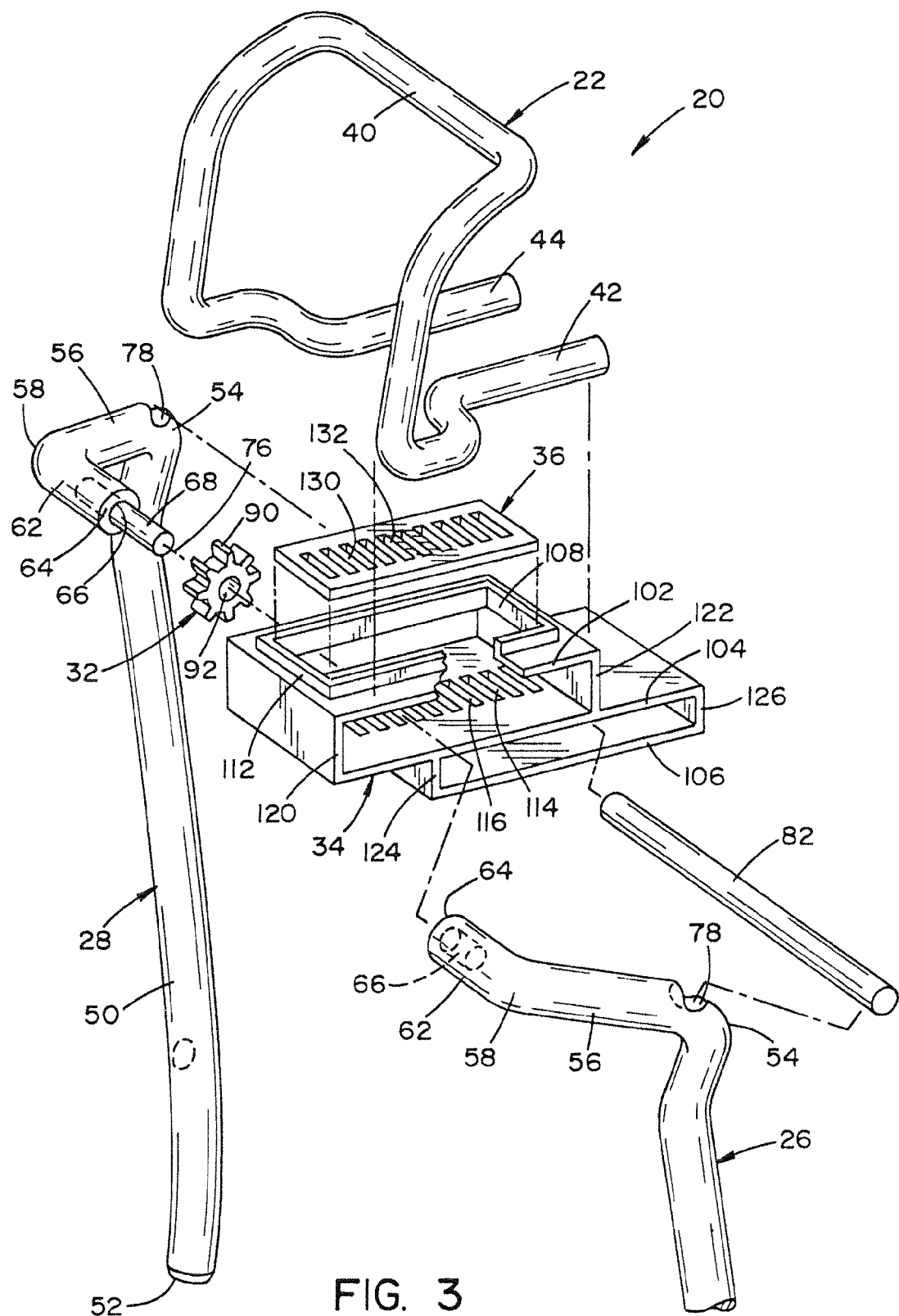
FIG. 3 is an exploded view of a vehicle head restraint assembly.

FIG. 3 depicts a vehicle head restraint assembly 20 that includes a support frame 22 for supporting a head restraint cushion 24 (FIG. 1). The vehicle head restraint assembly also includes a stay configured to connect with the vehicle seat back 12. In the depicted embodiment, a left stay 26 and a right stay 28 are provided. Also in the depicted embodiment, the left stay 26 is a mirror image of the right stay. The vehicle seat rest assembly also includes a rack and pinion assembly, which in the illustrated embodiment includes a pinion 32, a rack 34, and a locking cage 36. The rack and pinion assembly connects with the support frame 22 and the stays 26, 28. In the illustrated embodiment, the rack and pinion assembly is configured to allow for selective movement of the support frame 22, the head restraint 14 and the head restraint cushion 24 with respect to the stays 26, 28 along the translational axis 16 (FIGS. 2A-2C).

With continued reference to FIG. 3, the support frame 22 in the illustrated embodiment is a bent and/or formed metal rod having a U-shaped section 40 and base sections 42 and 44 at terminal ends of the U-shaped section. The support frame 22 provides a rigid member for supporting the head restraint cushion 24. The U-shaped section 40 generally defines a vertical plane along a lower region and bends to generally define an angled plane in an upper region of the U-shaped section. The support frame 22 bends at the terminal ends of the U-shaped section transitioning into the base sections 42 and 44, which extend rearwardly from the U-shaped section. In the illustrated embodiment, the base sections 42 and 44 are generally horizontally oriented. The left base section 42 is spaced from the right base section 44 to accommodate the connection of the support frame 22 to the rack 34. In the illustrated embodiment, the support frame 22 is fixed to the rack 34 such that the support frame 22 moves with the rack, i.e. when the rack 34 moves, the support frame 22 also moves.

As mentioned above, in the illustrated embodiment the left stay 26 is a mirror image of the right stay 28. For the sake of brevity, the right stay 28 will be described with particularity with an understanding that the left stay 26 is similarly configured. Accordingly, reference numbers that are used to describe the right stay 28 will also be used to describe the corresponding portion of the left stay 26 where appropriate.

In the illustrated embodiment, the right stay 28 is a bent and/or formed rigid rod, which can be solid or hollow, similar in diameter to the support frame 22. The right stay 28 includes a generally vertically oriented lower section 50 that extends into the vehicle seat back 12 (see FIG. 1). The lower section 50 can connect with a rigid frame (not shown) located in the vehicle seat back 12. The right stay 28 also includes a lower end 52 where the lower section 50 terminates. The right stay 28 also includes a first nearly 90 degree bend 54 where the vertically oriented lower section 50 transitions into a forward extending section 56 extending forwardly from the first bend. The first bend 54 occurs vertically above an upper edge of the seat back 12 (see FIGS. 2A-2C) and is where the stay transitions from the generally vertical section 50 to a more horizontally oriented section. The right stay 28 also includes a second nearly 90 degree bend 58 and an inwardly extending section 62 that extends inwardly from the second bend 58. The right stay 28 also includes an upper end 64 where the inwardly extending section 62 terminates. The upper end 64 is also vertically spaced above the upper edge of the seat back 12. In the illustrated embodiment, the forwardly extending section 56 is disposed between the first bend 54 and the second bend 58 and the inwardly extending section 62 is disposed between the second bend 58 and the upper end 64. In the illustrated embodiment, the forwardly extending section 56 and the inwardly extending section 62 are generally horizontally oriented. The right stay 28 has been described with particularity with respect to the embodiment depicted in FIG. 3; it should be understood, however, that the stay can take other configurations, for example configurations that may not include the bends 54 and 58.

The right stay 28 also includes an axle opening 66. In the illustrated embodiment, an axle 68 extends inwardly from the upper end 64 of the right stay 28 and the pinion 32 is received on the axle. In the illustrated embodiment, the axle 68 is received in the axle opening 66; however, at least one of the stays 26, 28 can be formed to include the axle. In the illustrated embodiment, the left stay 26 also includes the axle opening 66 that receives the axle 68. In the depicted embodiment, the axle 68 acts as a connector to connect the left stay 26 to the right stay 28. The upper end 64 of the left stay 26 is axially spaced from the upper end 64 of the right stay 28 at least as great as the axial dimension of the pinion 32 so that the pinion can freely rotate about a rotational axis 76 (FIG. 4), which in the illustrated embodiment is generally horizontal.

Each stay 26, 28 can also include a recess 78; however, such a recess is not required. As seen more clearly in FIG. 4, the recess 78 in the illustrated embodiment is offset rearwardly from and below the rotational axis 76 of the pinion 32. As seen in the illustrated embodiment, the recess 78 can be located near the first bend 54 and the forward extending section 56 of the stay 26, 28. Each recess 78 is configured to accommodate a load bearing support 82, which will be described in more detail below. The recess 78 is formed to provide a bearing surface that can counteract a vertically oriented force.

With reference back to FIG. 3, the pinion 32 includes a plurality of pinion teeth 90 that extend radially outwardly from the rotational axis 76. The pinion 32 also includes an opening 92 that is circular and concentric with the rotational axis 76. The opening 92 receives the axle 68, which allows the pinion 32 to rotate about the rotational axis 76.

With reference to embodiment illustrated in FIG. 3, the rack 34 includes a first wall 102, a second wall 104, and a third wall 106. In this depicted embodiment, the first wall 102 is spaced above the second wall 104 and the third wall 106 is spaced below the second wall 104. Each of these walls 102, 104 and 106 are generally horizontally oriented and for ease of understanding the FIGS., the first wall 102 can be referred to as the upper wall, the second wall 104 can be referred to as the intermediate wall, and the third wall 106 can be referred to as the lower wall.

The upper wall 102 includes an opening 108 extending through the upper wall. The locking cage 36 is selectively received in this opening 108. The shape and the dimensions of the periphery of the cage 36 are nearly the same as the shape and the dimensions of the opening 108. The rack 34 also includes a locking cage retainer 112. In the illustrated embodiment, the locking cage retainer 112 extends from the first wall 102. The locking cage 36 abuts the upper wall 102 and/or the locking cage retainer 112 when the locking cage is engaged with the rack 34. In the illustrated embodiment, the locking cage retainer 112 is an abutment wall that extends upwardly from and general normal to the upper wall 102. In the illustrated embodiment, the abutment wall 112 surrounds the opening 108. The abutment wall, or locking cage retainer 112, inhibits movement of the locking cage 36 with respect to the rack 34 when the locking cage is received in the opening 108.

Figure 4:
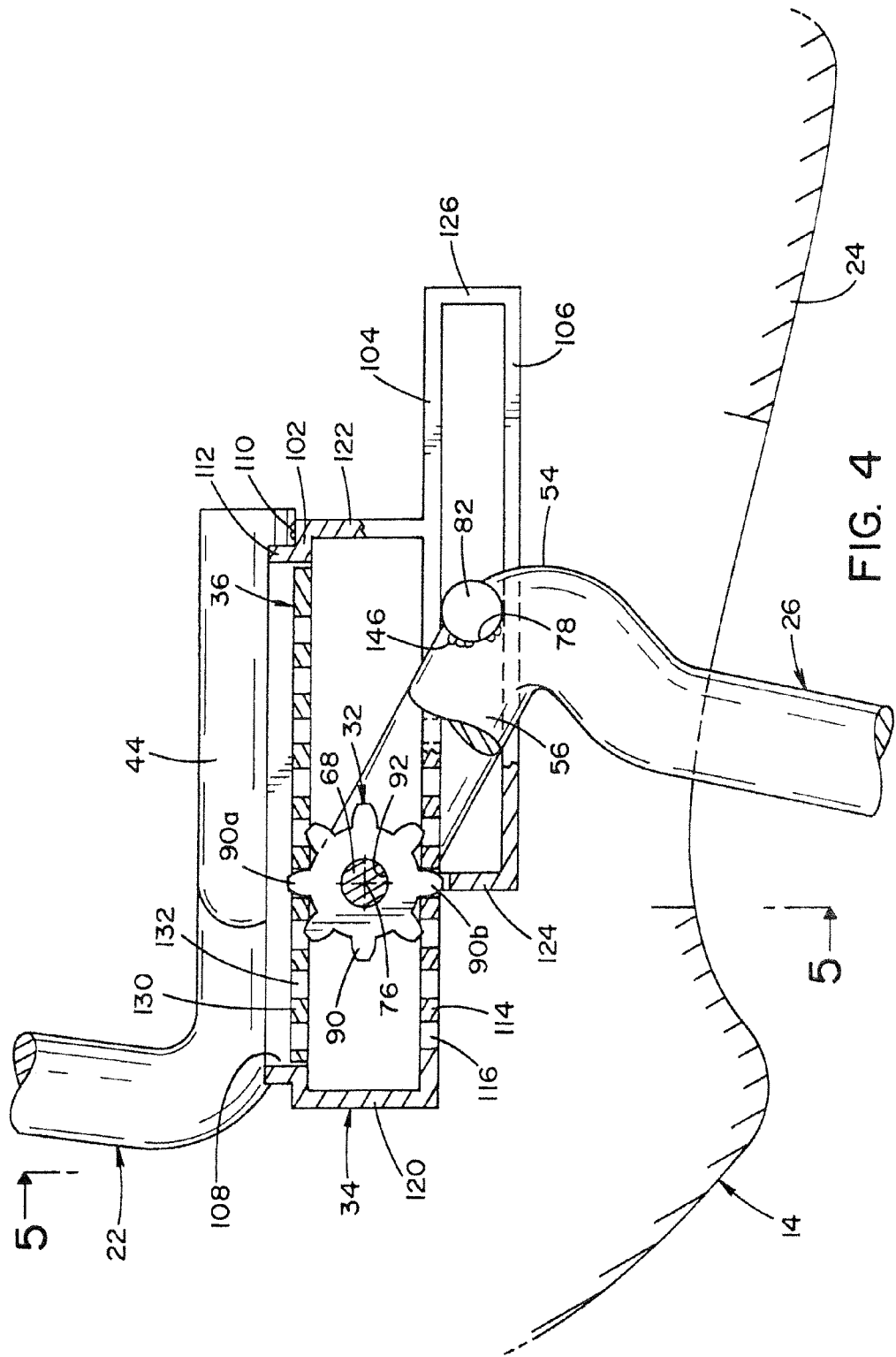
FIG. 4 is a side cross-sectional view of the vehicle head restraint assembly depicting an operating state where a support frame is inhibited from moving with respect to a stay.
Figure 5:
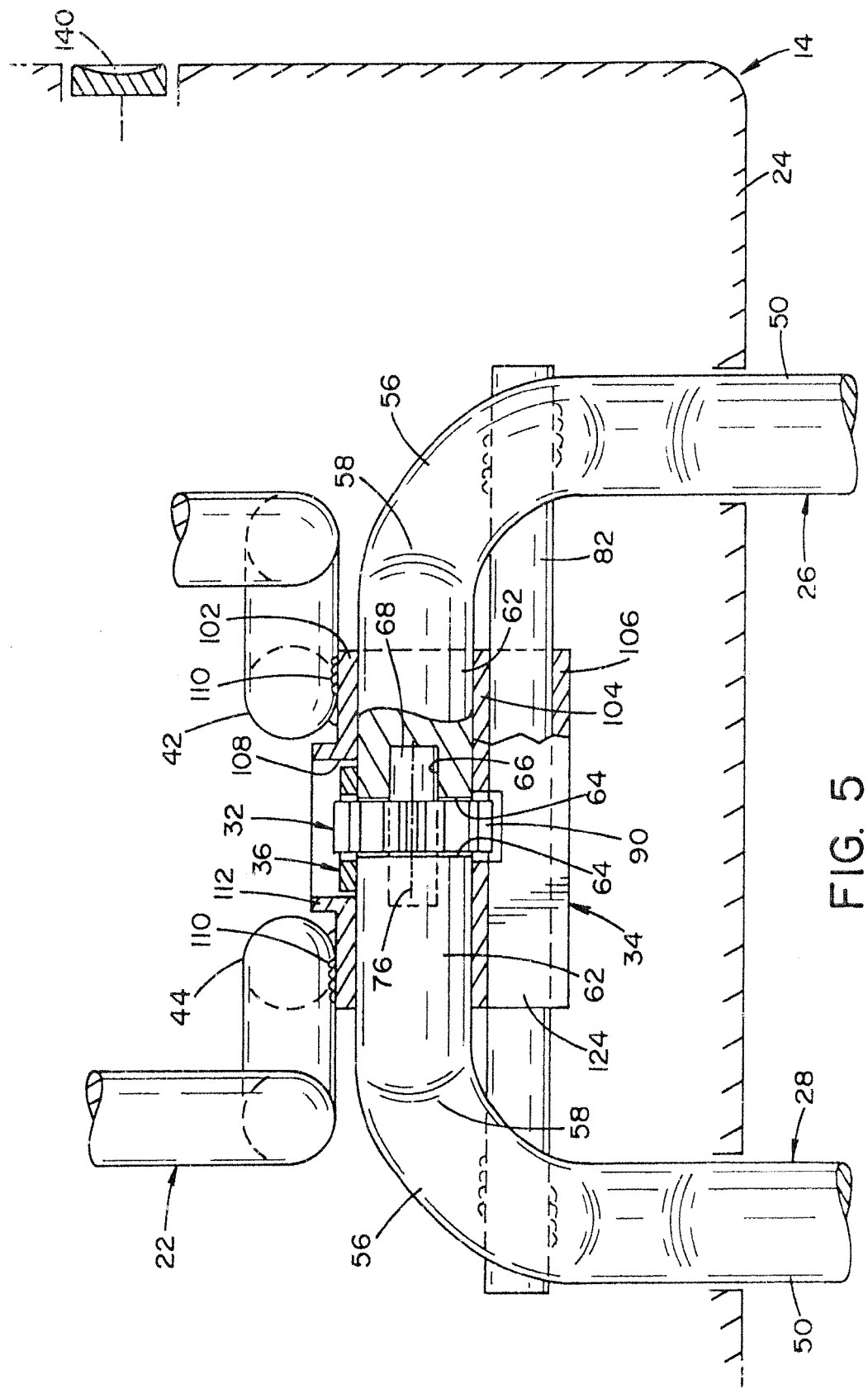
FIG. 5 is a cross-sectional view taken along line 5-5 in FIG. 4.

As more clearly seen in FIGS. 4 and 5, the rack 34 is connected with the support frame 22 and the stays 26, 28. More particularly, the support frame 22 rests on the upper wall 102 of the rack 34 and is fixed thereto via welds 110 (or other conventional fastening means). In the illustrated embodiment, the support frame 22 is fixed to the rack 34 for movement therewith. With continued reference to FIG. 5, the base sections 42, 44 of the support frame 22 are spaced from one another to accommodate the opening 108 in the upper wall 102. The right base section 42 can be laterally spaced from the left base section 44 slightly greater than the greatest lateral dimension of the opening 108.

The rack 34 also includes a plurality of rack teeth 114. The rack teeth 114 engage the pinion teeth 90 both when the support frame 22 is not moving with respect to the stays 26, 28 and when the support frame moves in the translational axis 16 with respect to the stays. In the illustrated embodiment, the rack teeth 114 are on the second wall 104. In the illustrated embodiment, the second wall 104 includes a plurality of apertures 116 that separate the rack teeth 114. The apertures 116 extend through the second wall 104 in the illustrated embodiment; however, these apertures could simply be notches that separate the plurality of rack teeth 114 so that the rack teeth can engage the pinion teeth 90.

As seen in FIG. 4, the upper wall 102 is spaced from the intermediate wall 104 about equal to an inner diameter (measured with respect to the circumference of the pinion 32 from which the teeth 90 extend). The lower wall 106 is spaced from the intermediate wall 104 a distance that is about equal to the diameter of the load bearing support 82. Accordingly, the pinion 32 is received between the upper wall 102 and the intermediate wall 104, and the load bearing support 82 is received between the intermediate wall 104 and the lower wall 106. In the illustrated embodiment, the lateral sides of the rack 34 are open.

The illustrated rack 34 also includes an upper forward end wall 120 interconnecting a forward end of the upper wall 102 to a forward end of the intermediate wall 104. The rack 34 also includes an upper rear wall 122. The upper rear wall 122 interconnects a rear edge of the upper wall 102 to the intermediate wall 104. The upper rear wall 122 is spaced forwardly from a rearmost edge of the intermediate wall 104. A lower forward wall 124 interconnects the intermediate wall 104 and a forward most edge of the lower wall 106. The lower forward wall 124 is spaced rearwardly from a forward most edge of the intermediate wall 104. A lower rear wall 126 interconnects a rear edge of the intermediate wall 104 and a rear edge of the lower wall 106. The forward and rearward walls 120, 122, 124 and 126 are generally vertically oriented in the illustrated embodiment. The rear wall 126 may be removable from the intermediate wall 104 and the lower wall 106 for assembly of the head rest assembly 20. The rear wall 126 can attach to the intermediate wall 104 and the lower wall 106 using fasteners, or the like.

The rack and pinion assembly also includes the locking cage 36 that selectively engages the rack 34 and is spaced from the rack teeth 114. In the illustrated embodiment, the locking cage 36 is a generally rectangular planar member that is similarly shaped and sized so that it is snugly received inside the opening 108 formed in the upper wall 102 of the rack 34. The locking cage 36 includes a plurality of locking cage teeth 130. When the locking cage 36 is engaged with the rack 34, the locking cage teeth 130 engage the pinion teeth 90 to inhibit movement of the support frame 22 with respect to the stays 26, 28. The locking cage 36 also includes a plurality of apertures 132 that separate the locking cage teeth 130. In the illustrated embodiment, the apertures 132 extend entirely through the locking cage 36. In an alternative embodiment, the locking cage teeth 130 could be formed on a surface of the locking cage 36 and have notches or pockets, similar to the aforementioned apertures but not extending entirely through the locking cage, disposed between the teeth 130 for engaging the pinion teeth 90.

Figure 6:
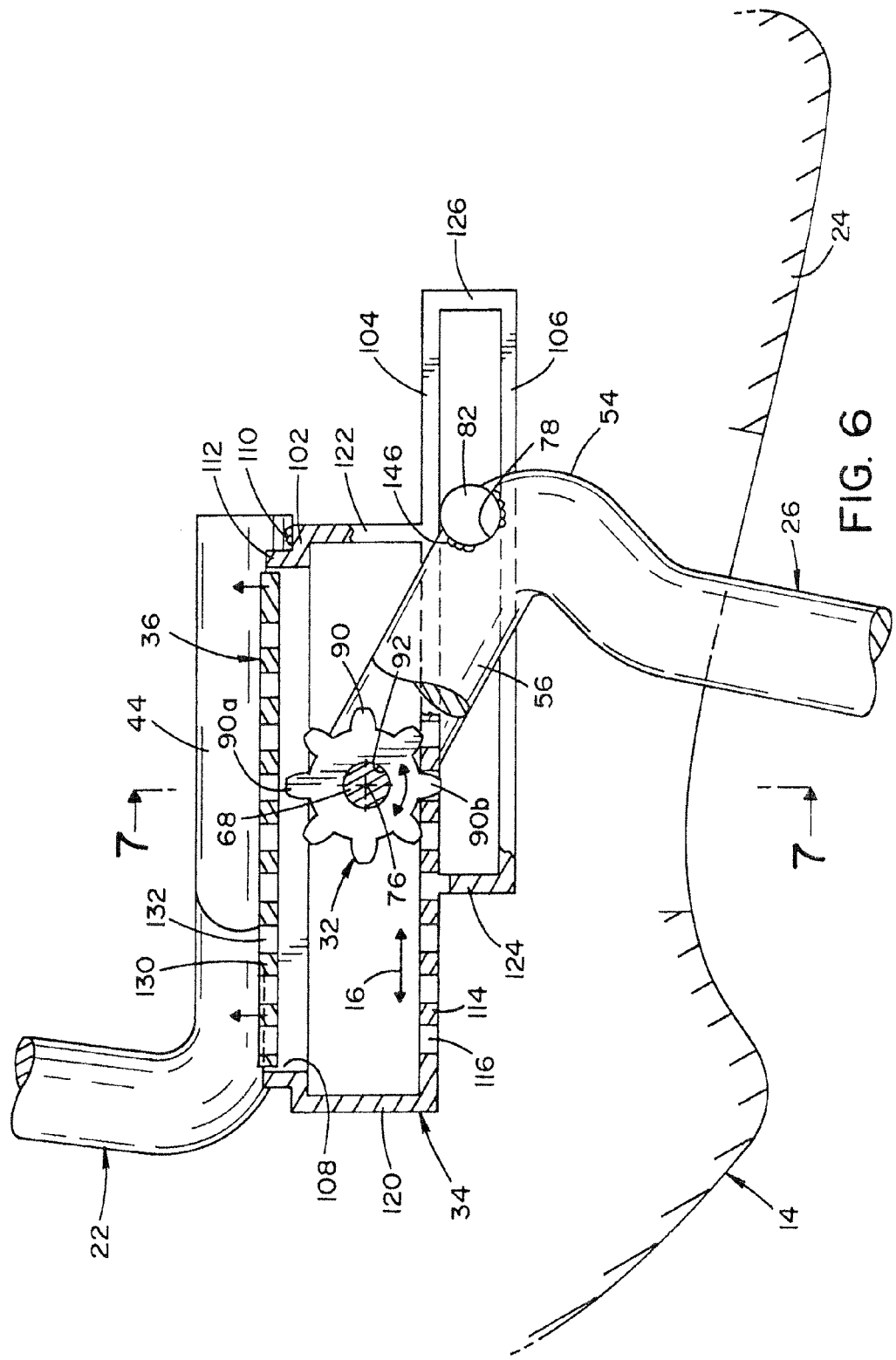
FIG. 6 is a cross-sectional view similar to FIG. 4, but showing an operating state where the support frame is moveable with respect to the stay.
Figure 7:
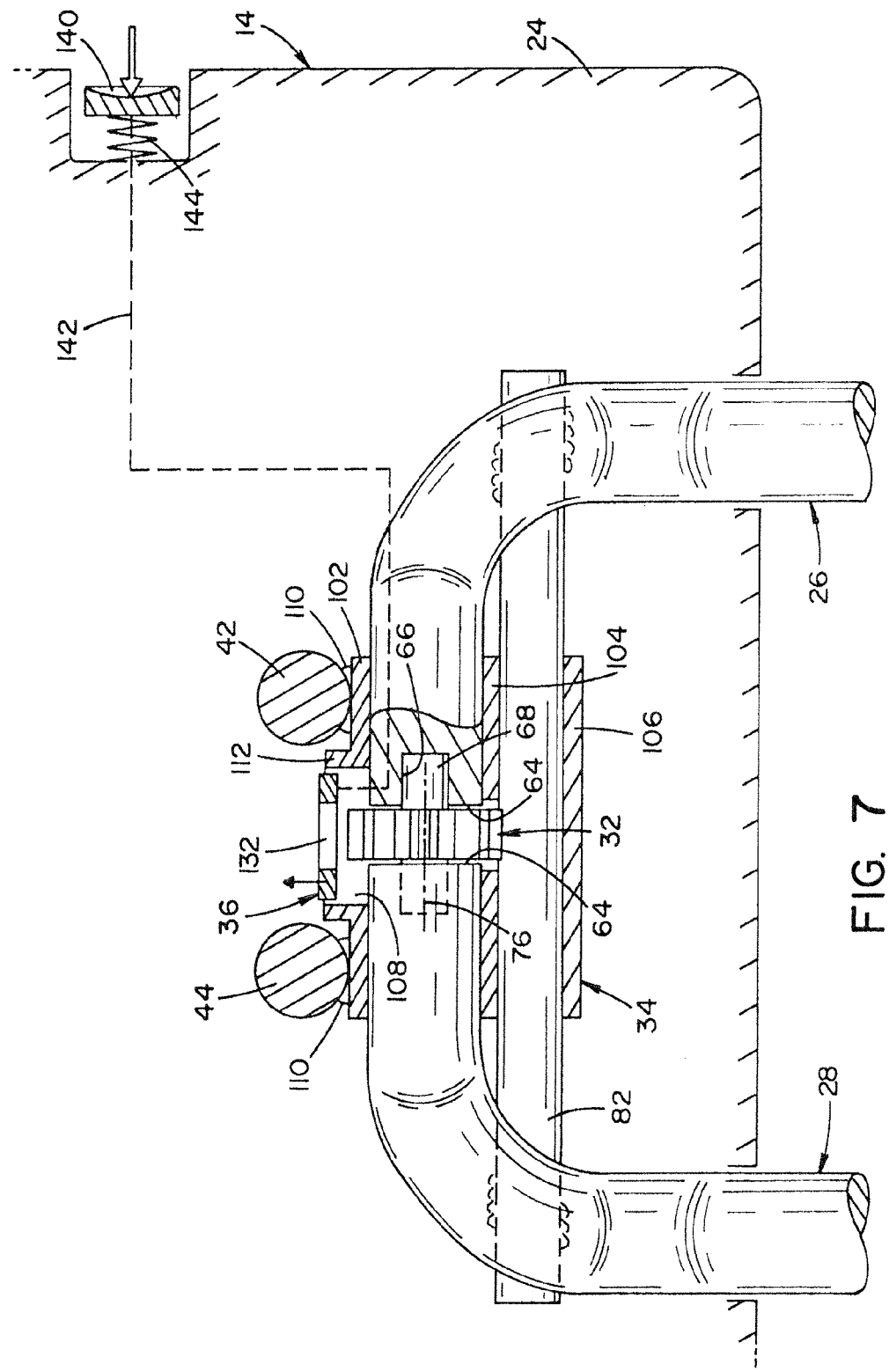
FIG. 7 is a cross-sectional view taken along line 7-7 in FIG. 6.

With reference to FIG. 4, the locking cage 36, which is moveable and thus can be referred to as a moveable locking cage, is moveable between a first operating position (FIGS. 4 and 5) and a second operating position (FIGS. 6 and 7). In the first operating position, the locking cage 36 engages the pinion 32 and the rack 34. In the first operating position, the locking cage 36 engages the upper wall 102 and/or is retained by the locking cage retainer 112. Since the locking cage 36 is precluded from moving along the translational axis 16 (see FIGS. 2A-2C and 7) rotational movement of the pinion 32 about the rotational axis 76 is precluded. In the illustrated embodiment and with reference to FIG. 4, one of the pinion teeth 90a engages a locking cage tooth 130 and another of the pinion teeth 90b engages a rack tooth 114. Pinion tooth 90a is on an opposite side of a diameter of the pinion 32 with respect to the pinion tooth 90b. With reference to FIGS. 6 and 7, when the moveable locking cage 36 is in the second operating position, the locking cage 36 is disengaged from the pinion 32, which allows the pinion to rotate. Since the pinion can rotate, the support frame 22, which is fixedly secured to the rack 34, can move with respect to the stays 26, 28.

With reference to FIG. 7, movement of the locking cage 36 can be the result of an operator depressing an actuator button 140 located on an external surface of the head restraint 14 (see FIG. 1). The actuator button 140 can be operably connected to the moveable locking cage 36 to result in the movement of the locking cage 36 from engagement with the pinion 32. Many types of mechanical and other connections can be provided, for example a cable 142 (depicted schematically) could be connected at one end to the actuator button 140 and at another end to the locking cage 36. Inward movement of the actuator button 140 can result in upward movement of the locking cage 36. The actuator button 140 could be biased back outwardly by a compression spring 144 (depicted schematically in FIG. 7), which would result in the locking cage 36 moving back downwardly to engage the pinion 32.

As mentioned above, a load bearing support 82 is connected with the stays 26, 28 and the rack 34. The load bearing support 82 can be a solid rigid rod. The load bearing support 82 contacts the rack 34 offset from the rotational axis 76 of the pinion. The load bearing support in the illustrated embodiment is received between the intermediate wall 104 and the lower wall 106. The load bearing support 82 contacts the rack 34 to counter a moment about the rotational axis of the pinion 32. The load bearing support connects with and spans from the right stay 26 to the left stay 28. In the illustrated embodiment, the load bearing support 82 is received inside the recesses 78 formed in each of the stays 26, 28 and connects with the stays 26, 28 via welds 146; however, other conventional fastening means can be used. Moreover, the load bearing support 82 can attach to each stay near the first bend 54 and not within the recess, for example where the stay is formed without such a recess.

A vehicle head restraint assembly has been described above in detail. Modifications and alterations will occur to those skilled in the art upon reading and understanding the preceding detailed description. The invention, however, is not limited to only the embodiments described above. Instead, the invention is defined by the appended claims and the equivalents thereof.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle head restraint assembly comprising:
a support frame for supporting a head restraint cushion;
a stay configured to connect with an associated vehicle seat back; and
a rack and pinion assembly connected with the support frame and the stay, the rack and pinion assembly being configured to allow for selective movement of the support frame with respect to the stay along a translational axis, the rack and pinion assembly including:
a pinion including a plurality of pinion teeth;
a rack including a plurality of rack teeth, the rack teeth engaging the pinion teeth when the support frame moves in the translational axis with respect to the stay; and
a locking cage selectively engaging the rack and spaced from the rack teeth, the locking cage including locking cage teeth, when the locking cage is engaged with the rack the locking cage teeth engage the pinion teeth to inhibit movement of the support frame with respect to the stay.

2. The vehicle head restraint assembly of claim 1, wherein the stay includes a left stay and a right stay.

3. The vehicle head restraint assembly of claim 1, wherein a lower end of the stay is configured to be received in the associated seat back and an upper end of the stay is configured to be vertically spaced from an upper edge of the associated seat back, and the pinion rotates about a rotational axis defined by the upper end of the stay.

4. The vehicle head restraint assembly of claim 3, further comprising an axle extending from the upper end of the stay and the pinion is received on the axle.

5. The vehicle head restraint assembly of claim 1, wherein the rack includes a first wall, a second wall, and a third wall, the first wall being spaced above the second wall and the third wall being spaced below the second wall.

6. The vehicle head restraint assembly of claim 5, wherein the pinion is located between the first wall and the second wall.

7. The vehicle head restraint assembly of claim 6, wherein the rack teeth are on the second wall and the locking cage selectively engages the first wall.

8. The vehicle head restraint assembly of claim 7, wherein the second wall includes a plurality of apertures or notches that separate the rack teeth.

9. The vehicle head restraint assembly of claim 8, wherein the first wall includes an opening extending through the first wall, and the locking cage is selectively received in the opening.

10. The vehicle head restraint assembly of claim 9, wherein the rack includes a locking cage retainer extending from the first wall and the locking cage abuts the locking cage retainer when the locking cage is engaged with the rack.

11. The vehicle head restraint assembly of claim 5, further comprising a load bearing support connected with the stay and the rack, the load bearing support being offset from a rotational axis of the pinion along the translational axis.

12. The vehicle head restraint assembly of claim 11, wherein the load bearing support contacts and extends from the stay and is received between the second wall and the third wall.

13. A vehicle head restraint assembly comprising:
a stay configured to connect with an associated vehicle seat back;
a support frame for supporting a head restraint cushion, the support frame being connected with the stay in a manner that allows the support frame to selectively move with respect to the stay;
a rack connected with the support frame and the stay, the rack longitudinally fixed relative to the support frame;
a pinion connected with the stay and engaging the rack, the pinion longitudinally fixed relative to the stay; and
a load bearing support connected with the stay and the rack, the rack longitudinally movable relative to the load bearing support, wherein the load bearing support contacts the rack offset from a rotational axis of the pinion.

14. The vehicle head restraint assembly of claim 13, wherein the load bearing support contacts the rack to counter a moment about the rotational axis of the pinion.

15. The vehicle head restraint assembly of claim 14, wherein the stay includes a left stay and a right stay, and the load bearing support connects with and spans from the left stay to the right stay.

16. The vehicle head restraint assembly of claim 13 further including:
a movable locking cage that together with the rack surrounds the pinion, wherein the locking cage is movable between a first operating position and a second operating position, when in the first operating position the support frame is precluded from moving with respect to the frame and when in the second operating position the support frame is movable with respect to the frame.

17. A vehicle head restraint assembly comprising:
a stay;
a pinion connected adjacent one end of the stay;
a rack engaging the pinion;
a support frame fixed to the rack for movement therewith; and
a movable locking cage positioned to engage the pinion at a location diametrically opposed to a location where the rack engages the pinion, wherein the locking cage is movable between a first operating position and a second operating position, when in the first operating position the support frame is precluded from moving with respect to the stay and when in the second operating position the support frame is movable with respect to the stay.

18. The vehicle head restraint assembly of claim 17, wherein the locking cage engages the pinion and the rack in the first operating position.

19. The vehicle head restraint assembly of claim 18, wherein the locking cage is disengaged from the pinion and the rack in the second operating position.

20. The vehicle head restraint assembly of claim 19, wherein the rack includes a first wall, a second wall, and a third wall, the first wall being spaced above the second wall and the third wall being spaced below the second wall.

21. The vehicle head restraint assembly of claim 20, wherein the pinion is received between the first wall and the second wall and the load bearing support is received between the second wall and the third wall.

* * * * *